3,437,331
METAL PURIFYING APPARATUS
Erwin C. Handwerk, Grosse Ile, Mich., assignor to Matthiessen & Hegeler Zinc Company, La Salle, Ill., a corporation of Illinois
Filed June 17, 1966, Ser. No. 558,298
Int. Cl. C21c 5/40; F27d 17/00; C22b 19/16
U.S. Cl. 266—37                                                   8 Claims

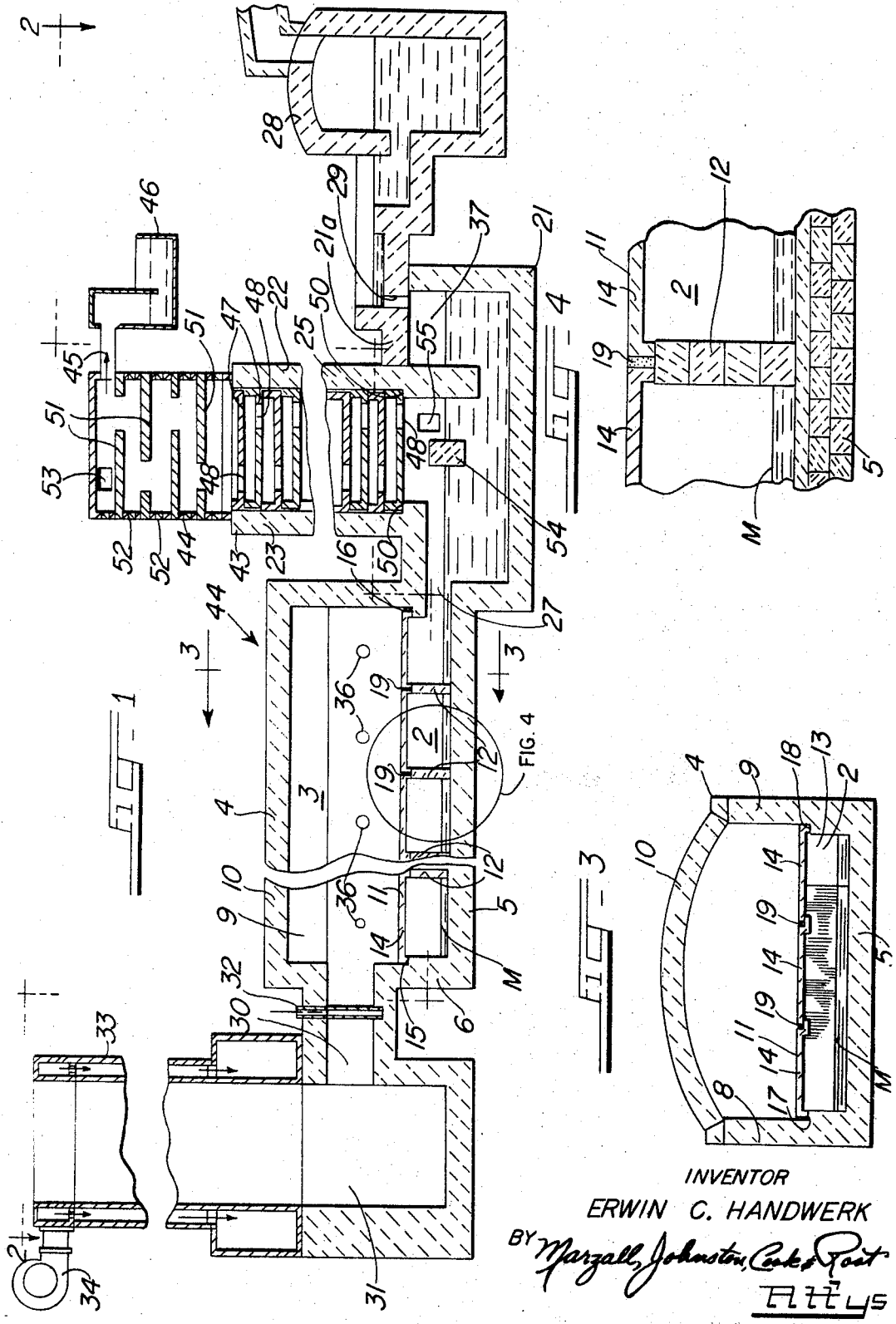

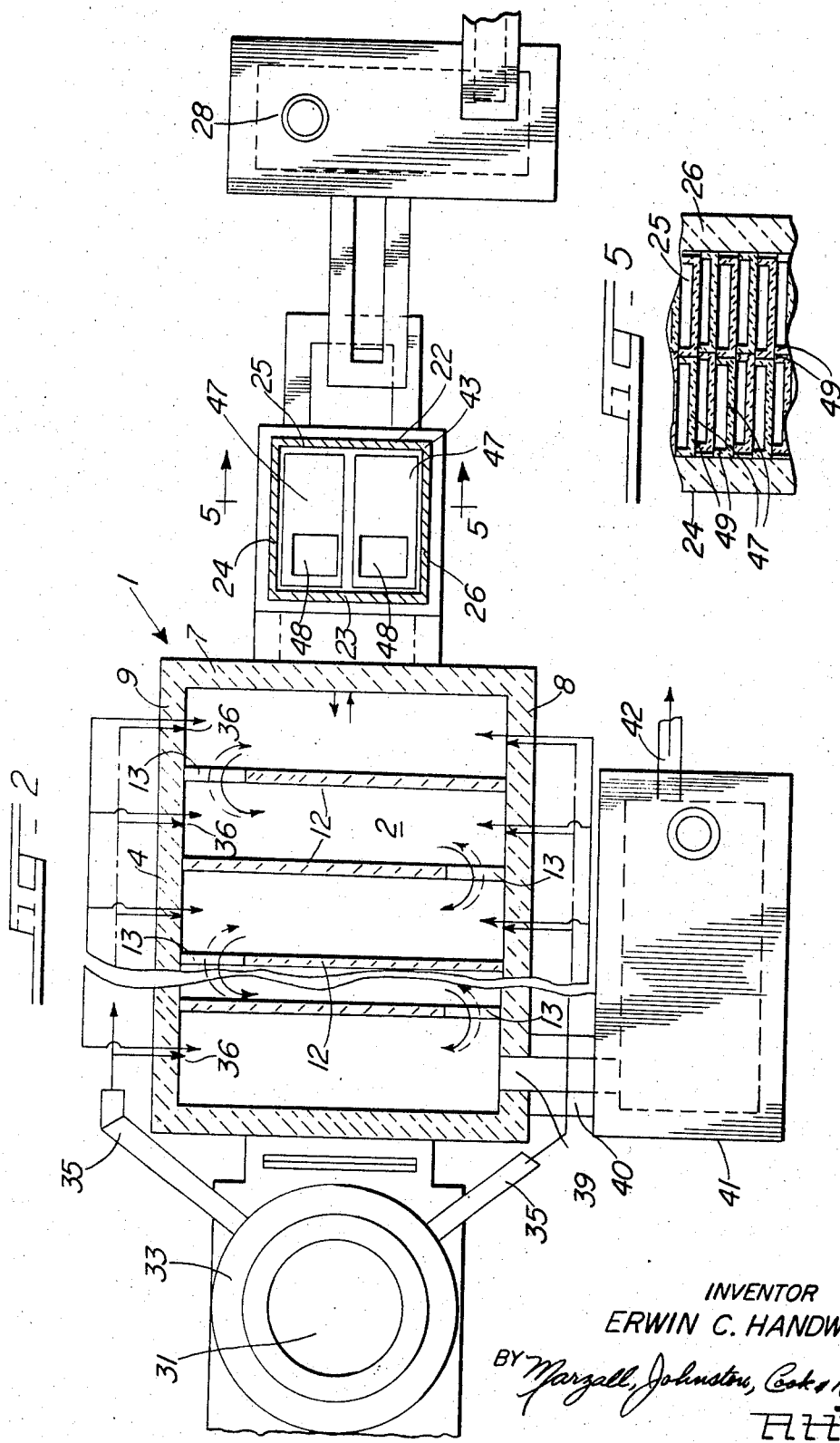

ABSTRACT OF THE DISCLOSURE

Apparatus for purifying zinc including a horizontal boiler, inlet means connected to one end of said boiler by a passageway for feeding a charge of impure molten metal containing zinc to be purified into said boiler and receiving vapor from said boiler, means for heating said boiler to above the boil-point of certain materials in said molten metal to thereby vaporize said materials, means dividing said boiler into a tortuous path for said molten metal from said one end to the other end of said boiler, and for said vaporized materials from said other end to said one end, a reflux column mounted on and projecting upwardly from said inlet means in direct communication therewith, and means for discharging molten metal from said other end of said boiler.

---

This invention relates to metal purifying apparatus, and more particularly, to apparatus which is particularly well adapted for purifying zinc.

The primary object of the present invention is to afford a novel apparatus for purifying metal.

Another object is to afford novel apparatus for purifying zinc in a novel and expeditious manner by the fractional distillation method.

Another object is to afford novel apparatus of the aforementioned type which embodies a novel boiler constituted and arranged in a novel and expeditious manner.

A further object is to enable such a novel boiler to be constituted and arranged in a novel and expeditious manner with a reflux column.

Apparatus for purifying zinc by fractional distillation, and embodying a reflux column has been heretofore known in the art. However, such apparatuses have heretofore commonly had several inherent disadvantages such as, for example, permitting undesirably rapid diffusion of vapors or molten metal; inefficient fractional boiling of the metals; poor heat transfer to the molten metal to be boiled; inefficient conversion of heat energy to boiling energy; inefficient separation of impurities from metals to be purified; or requiring large, massive boilers, and the like. It is an important object of the present invention to overcome such disadvantages.

Another of the objects of the present invention is to afford novel apparatus for purifying zinc by the fractional distillation method wherein a relatively shallow depth of molten metal may be used in the boiler.

Yet another object is to afford novel apparatus for purifying zinc wherein the parts thereof are constituted and arranged in such a manner that most of the radiant heat energy supplied to the boiler can be converted to boiling energy for the metal therein.

A further object of the present invention is to afford novel apparatus for purifying zinc by the fractional distillation method which has a relatively large capacity while being relatively small and compact in size.

Another object is to afford a novel apparatus for purifying zinc of the aforementioned type which is capable of continuous operation for prolonged periods of time.

A further object is to afford a novel apparatus for purifying metal which is highly effective to remove lower boiling point impurities, such as cadmium or higher boiling point metals, such as zinc, in a novel and expeditious manner.

Another object of the present invention is to afford novel apparatus of the aforementioned type which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary, somewhat diagrammatic, longitudinal sectional view through a metal purifying apparatus embodying the principles of the present invention;

FIG. 2 is a fragmentary sectional view taken substantially along the line 2—2 in FIG. 1;

FIG. 3 is a transverse sectional view taken substantially along the line 3—3 in FIG. 1;

FIG. 4 is an enlarged, fragmentary, detail sectional view of a portion of the apparatus shown in FIG. 1; and FIG. 5 is a fragmentary, detail sectional view taken substantially along the line 5—5 in FIG. 2.

An apparatus 1, embodying the principles of the present invention, is shown in the drawings to illustrate the presently preferred embodiment of the present invention.

The apparatus 1 includes a boiler 2 and a furnace or combustion chamber 3 embodied in a unitary housing 4, the outer walls of which are made of suitable refractory material such as, for example, firebrick. The housing 4 is elongated in a horizontal direction and embodies a substantially flat, elongated bottom wall 5, two oppositely disposed upright end walls 6 and 7, two longitudinally extending, oppositely disposed side walls 8 and 9, and a transversely arched roof or top wall 10, FIGS. 1 and 3.

The boiler 2 occupies the bottom of the housing 4 and is separated from the combustion chamber 3, which is disposed thereabove, by a top wall 11. A plurality of substantially parallel, upright partition walls 12, FIGS. 1–3, are spaced from each other longitudinally of the boiler 2. The partition walls 12 are shorter than the inside width of the boiler 2, and alternate ones thereof project from the respective side walls 8 and 9, and terminate in inwardly spaced relation to the opposite side walls 9 and 8, respectively, to thereby afford passageways 13 between the last mentioned end of each partition wall 12 and the side wall 8 or 9 immediately adjacent thereto. This arrangement of the partition walls 12 in the boiler 2 affords a tortuous path for the passage of molten metal and metal vapors between the ends of the boiler 2, as indicated by solid and broken arrows, respectively, in FIG. 2, for a purpose which will be discussed in greater detail presently.

The top wall 11 of the boiler 2 comprises a plurality of silicon carbide panels 14, which are rectangular in shape. The panels 14 are of such size that those disposed adjacent to the end wall 6 of the housing 4 rest on a shoulder 15 formed therein and on the next adjacent partition wall 12; the panels disposed adjacent to the end wall 7 of the housing 4 rest on a shoulder 16 formed therein and on the next adjacent partition wall 12; and the panels disposed between the two endmost partition walls 12 rest on respective adjacent pairs of the partition walls 12, FIG.

1. Transversely of the length of the housing 4, adjacent ones of the panels 14 are preferably disposed in interlocking engagement with each other, FIG. 3, with the endmost panel resting on shoulders 17 and 18 formed in the side walls 8 and 9 of the housing 4. The edges of adjacent panels 14 are preferably spaced from each other so as to provide for expansion thereof, and the spaces are preferably sealed by a suitable cement 19, such as, for example, a mixture of fire clay cement and silicon carbide.

A chamber 21 is formed in the housing 4, FIG. 1, outwardly of the end wall 7 thereof. A reflux column 22 projects upwardly from the top wall 21a of the chamber 21, and is in direct communication at its lower end with the top of the interior of the chamber 21. The reflux column 22 is preferably rectangular in transverse cross section, having four outside walls 23, 24, 25 and 26, FIG. 2.

The chamber 21 is preferably deeper than the boiler 2, and is connected thereto by a passageway 27 extending through the end wall 7 of the housing 4, FIG. 1, for a purpose which will be discussed in further detail presently.

A metal preheating pot 28 is preferably mounted beside the chamber 21 at the side thereof remote from the end wall 7 of the housing 4, and is suitably connected to an inlet 29 in the chamber 21 for feeding molten metal through the inlet 29 into the chamber 21, from which it is fed through the passageway 27 into the boiler 22, as will be discussed in greater detail presently.

The combustion chamber 3 is connected through a suitable passageway 30 in the end wall 6 of the housing 4 to a stack or chimney 31. A suitable damper 32 is disposed in the passageway 30 for controlling the flow of combustion products from the chamber 3 to the chimney 31.

A preheater 33 is preferably mounted on the chimney 31. The preheater 33 includes a blower 34 for feeding air downwardly therethrough, the air being fed under pressure from the lower end of the preheater 33 through passageways 35 to burners 36 in the side walls 8 and 9 of the housing 4, above the top wall 11 of the boiler 2. Suitable fuel, such as, for example, gas or oil may be fed under pressure from a suitable source, not shown, to the burners 36, where it is mixed with the air discharged from the passageways 35 for combustion in the chamber 3, to thereby heat the boiler 2. The heat from the combustion products passing upwardly through the chamber 31 is effective to preheat the air fed downwardly through the preheater 33 before it reaches the burners 36.

In the operation of the apparatus 1, a melt M, in the form of molten, impure zinc to be purified, is preferably fed from a suitable source, such as the preheating pot 28, into the chamber 21 to a level wherein it flows through the passageway 27 into the boiler 2. The wall 25 on the reflux column 22, remote from the end wall 7 of the housing 4 projects downwardly into the chamber 21 a sufficient distance that it projects downwardly into the molten metal in the chamber 21 between the inlet 29 and the outlet 27 of the chamber 21. The downwardly projecting portion of the wall 25 of the reflux column 22 thus affords a liquid seal between the inlet 29 and the outlet 27 of the chamber 21, and also prevents sludge, or other foreign material, which might be floating on top of the molten metal from passing from the portion 37 of the chamber 21 disposed between the wall 25 and the inlet 29 to the portion 38 of the chamber 21 disposed between the wall 25 and the outlet 27.

The temperature at which the molten metal is fed into the chamber 21 from the preheating pot 28, of course, various with the composition of the metal. The composition of a typical charge of molten metal which is well adapted to be purified in the apparatus 1, could be as follows:

| | Percent |
|---|---|
| Pb | .2–.3 |
| Cd | .12–.20 |
| Fe | .005–.02 |
| Zn | Balance |

It will be appreciated by those skilled in the art that the above set forth composition is merely by way of illustration, and not by way of limitation, and charges having other compositions may be purified in the apparatus 1 without departing from the purview of the present invention.

With the charge fed into the chamber 21 having a composition of the general nature set forth above, the temperature of the molten metal fed from a preheating pot to chamber 21 is preferably between 550° and 600° C. During passage of the molten metal through the chamber 21, it is further preheated by the heat in the zinc vapor from the boiler 2 and the reflux from the column 22 to a temperature in the range of 900°–907° C. With the charge fed into the chamber 21 having a composition of the aforementioned type, a suitable temperature in the combustion chamber 3 of the apparatus 1 normally would be between 1300° and 1400° C., and is preferably between 1300° and 1350° C., when the apparatus is being used to purify the zinc of cadmium.

Such temperatures in the combustion chamber 3 are effective, through radiation through the silicon carbide top wall 11 of the boiler 2, to cause the melt M in the bottom of the boiler 2 to be heated to a temperature at, or somewhat in excess of, the boiling point of zinc, which is 907° C. This is effective to cause vaporization of zinc and other materials in the melt having lower boiling points than zinc, such as, for example, cadmium, which has a boiling point of 765° C. Such temperatures are not effective to vaporize materials in the melt having higher boiling points, such as, for example, lead, having a boiling point of 1740° C., and iron, having a boiling point of 3070° C., although, as is well known in the art, a small percentage of such higher boiling point impurities may be carried into the vapor in the upper portion of the boiler 2 because of mechanical spraying by bursting bubbles of the melt M, and the like.

Preferably, during the operation of the apparatus 1, the feeding of molten metal from the source of supply, such as, the preheating pot 28, into the chamber 21 is continuous, suitable controls, such as, for example, a needle valve, not shown, and which are well known in the art being disposed at a suitable location, such as in inlet 29 of the chamber 21, for controlling the rate of flow of molten metal into the chamber 21. A tap hole or discharge passageway 39 is afforded in the bottom of the boiler 2 adjacent to the end wall 6 of the housing 4 and extends outwardly through the side wall 8 for draining melt, in the form of purified zinc, from the boiler 2. If desired, the discharge passageway 39 may be connected by a suitable conduit 40 to a refined-metal cooling pot 41, FIG. 2, for cooling. The cooled, purified zinc may be discharged from the cooling pot through a discharge outlet 42 to any suitable discharge station, such as, for example, into a suitable receptacle, not shown, for casting thereof.

In its passage through the boiler 2, the melt M flows from the inlet 27 thereof to the molten metal outlet 39 at the other end thereof through a tortuous path which winds back and forth across the full width of the boiler 2 through the passageways 13. This path extends around the respective opposite ends of adjacent ones of the partition walls 12, as shown by the solid arrows in FIG. 2. Such construction prevents a "short circuit" flow or diffusion of insufficiently heated melt from the inlet 27 to the outlet 39 of the boiler 2, thus insuring adequate heating of all of the melt M passing through the boiler 2.

The vapors formed in the upper portion of the boiler 2 by the aforementioned heating of melt M therein pass through the upper portion of the boiler 2 in a tortuous path which is directly counter-current to the path of the melt M, as indicated by broken-line arrows in FIG. 1, the passageways 13 extending from the bottom to the top of the boiler 2. These vapors are discharged through the inlet passageway 27 of the boiler 2 into the upper portion of the chamber 21, from which they pass upwardly into the lower end of the reflux column 22. The reflux column 22 preferably embodies a fractionating column 43 at the lower end thereof, and a reflux condenser 44 at the upper end thereof, FIG. 1. In the apparatus 1 shown in the drawings, the upper end of the reflux condenser 44 is connected by a suitable outlet 45 to a zinc-cadmium vapor condenser 46, which may be of any suitable type heretofore known in the art.

The reflux column 22 may be of any suitable type, but preferably embodies a construction wherein a plurality of horizontal baffles in the form of rectangular-shaped fractionating trays 47 are disposed in stacked relation within the walls 23–26 of the fractionating column 43. The trays 47 are preferably made of high thermal conductivity refractory material such as silicon-carbide so as to effect efficient heating of the molten material thereon. The walls 23–26 of the fractionating column 43 are preferably made of a suitable low thermal conductivity refractory material, such as, for example, firebrick, so as to insulate the fractionating column 43 against heat loss and expedite the effecting of equilibrium therein.

In the fractionating column 43 shown in the drawings, each layer of trays 47 embodies two such trays 47 disposed in side-by-side relation between the walls 24 and 26, FIGS. 2 and 5. The trays 47 are longer in the direction between the walls 23 and 25 than they are in the direction between the walls 24 and 26, and each embodies an opening 48 in one end thereof. The openings 48 in adjacent layers of trays 47 are disposed at opposite ends, so that the vapors passing upwardly through the fractionating column 43 must follow a tortuous path back and forth between the walls 23 and 25, and the molten metal passing downwardly through the fractionating column 43 must also follow a tortuous path back and forth between the side walls 23 and 25, counter-current to the path of travel of the aforementioned vapors, so as to insure intimate contact between such molten metal and vapors.

Each of the trays 47 preferably has an upstanding rib 49 thereon, the rib extending completely around the periphery of the tray. The lowermost trays 47 are supported on shoulders 50 formed in the side walls 23–26 of the fractionating column 43, FIG. 1. Each of the trays 47 above the lowermost trays rests on, and is supported by, the rib 49 on the next adjacent lower tray, so as to afford a space between the main body portion of adjacent trays for the flow of molten metal and vapor therebetween.

The trays 47 are preferably of such length and width, that when they are disposed in the fractionating column 43, each layer of trays is somewhat shorter, such as, for example, one-quarter of an inch shorter, both in width and length than the distance between the side walls 24 and 26 and the side walls 23 and 25, respectively, of the fractionating column 43. The flanges 49 on the trays 47 are preferably of such width that adjacent layers of the trays 47 may be disposed alternately closer to the walls 23 and 25 and to the walls 24 and 26, as shown in FIG. 5 with respect to the positioning thereof relative to the walls 24 and 26, so that a seal is maintained between the outer peripheral edges of the stack of trays 47 and the walls 23 and 26 of the fractionating column 43, which is effective to prevent the passage of vapor or metal therebetween.

The reflux condenser 44 of the reflux column 22 embodies a plurality of stacked trays 51, which may be of the same general construction as the trays 47. Normally, the trays 51 in the reflux condenser 44 are spaced from each other vertically a greater distance than the trays 47 in the fractionating column 43, and this may be accomplished by the insertion of spacers 52. Preferably, the spacers 52 have a rectangular ring-shape, corresponding to the size and shape of the outer peripheral edges of the trays 51, and the trays 51 and the spacers 52 are disposed in stacked relation to each other. The trays 51 and the spacers 52 are preferably made of a suitable refractory material having high heat-transferring characteristics, such as, for example, silicon carbide, and controlled insulation is disposed therearound. The thickness and heat-insulating characteristics of the trays 51 and the spacers 52 are so proportioned as to afford sufficient cooling to the vapors passing upwardly therethrough that most of the zinc therein is liquified and passes downwardly therefrom into the fractionating column 43, while lower boiling point material, such as, for example, cadmium, is not condensed and passes over into the condenser 46, where it may be condensed into a suitable form, such as, for example, a powder. Of course, a small percentage of zinc in the vapors passing into the reflux column 22 passes over with the cadmium into the condenser 46, so as to insure against a back pressure in the reflux column 22 which might afford a reverse flow of air thereinto and cause problems due to oxidation. Preferably a clean-out opening 53 is afforded at the top of the reflux condenser 44 so that if "blue powder" or zinc dust should form near the outlet 45 for the cadmium-enriched vapors in the reflux condenser 44, it can be readily cleaned out of the condenser 44 so as to prevent the buildup of back pressure, and also, prevent the dust from passing back down through the reflux column 22. During the operation of the apparatus 1, the clean-out opening 53 is normally closed by a suitable door or by means of fire clay, or the like.

The openings 48 in the lowermost set of trays 47 in the reflux column 22 are preferably disposed directly above the side of the portion 37 of the chamber 21 remote from the inlet passageway 27 to the boiler 2. A bridge wall 54 is mounted in and extends between the side walls 8 and 9 of the housing 4 in the chamber 21. The bridge wall 54 is disposed to the left of the openings 48 in the lowermost layer of trays 47, as viewed in FIG. 1, and is so disposed that it extends below the upper level of the melt M in the chamber 21 so as to act as a dam for preventing any sludge or other impurities floating on top of the melt M to the right of the bridge wall 54, as viewed in FIG. 1, from entering the boiler 2. Thus, any dust, or other impurities which might pass downwardly from the reflux column 22 into the chamber 21 and float on top of the melt therein will be prevented by the bridge wall 54 from entering the boiler 2. A clean-out opening 55 is afforded in the side wall 9 of the chamber 21 between the bridge wall 54 and the wall 25 of the reflux column 22 so that any floating impurities trapped by the bridge wall 54 in the chamber 21 may be periodically skimmed off or otherwise appropriately cleaned out of the chamber 21. The opening 55, during operation of the apparatus 1, is normally closed by a suitable door or by other suitable means such as by fire clay, or the like.

In the operation of the apparatus 1, molten metal may be fed continuously into the chamber 21 from the preheating pot 28. From the chamber 21 the melt flows through the inlet passageway 27 into the boiler 2, and it may be withdrawn or discharged either periodically, or continuously through the outlet passageway 39. During the passage of the melt M through the boiler 2, it is heated by the radiant heat passing through the top wall 11 from the combustion chamber 3 to thereby vaporize zinc and the impurities, such as cadmium, having a lower boiling point than zinc.

The flow of the melt M through the boiler 2 in the tortuous path afforded by the staggered passageways 13 therein insures against rapid diffusion of molten metal from the inlet 27 to the outlet 39. The flow of vapor in the upper portion of the boiler 2 is through the same tortuous path as the melt M, but in direct counter-current relation thereto, assists in the establishment of the desired equilibrium between the melt M and the vapor, and prevents the rapid diffusion of the vapor from the outlet end of the boiler 2 to the inlet passageway 27.

The direct connection of the reflux column 22 with the upper portion of the chamber 21, by the mounting thereof on the housing 4 directly above the portion 37 of the chamber 21 enables heat from the boiler 2 to be effectively utilized in affording the heat necessary for the proper fractionating operation of the reflux column 22. Also, with the reflux column thus constituted and arranged, the molten metal returned (refluxed) by the reflux column 22 may pass directly into the melt M, being fed into the boiler 2 in such a manner as to insure an efficient return of this purified molten metal to the melt M being purified in the apparatus 1. The return of purified metal from the reflux column 2 to the melt M is continuous during operation of the apparatus 1, and is preferably sufficiently extensive that it continuously amounts to 20% to 30% of the zinc being fed into the boiler 2.

With the boiler 2 and the combustion chamber 3 constituted and arranged in the apparatus 1 in the same manner disclosed herein, a relatively small compact unit of relatively high metal-treating capacity may be afforded. Thus, for example, with the apparatus 1 embodying a housing 4 having an overall height of 7½ feet, an inside width of 6½ feet, and and inside boiler length of 11½ feet, six to eight tons of zinc having a cadmium content of .04% may be produced per day from a charge having the composition heretofore set forth. In such a unit, the overall thickness of the plates 14 from which the top wall 11 of the boiler 2 is constructed may be in the nature of 3½ inches, with the main body portion of these plates having a thickness in the nature of 2 inches; the depth of the melt M in the boiler 2 may be in the nature of 3 inches; and the distance between the top of the melt M and the top wall 11 may be in the nature of 6 inches to 15 inches.

With such construction, most of the radiant heat energy afforded by the combustion chamber 3 to the boiler 2 is efficiently converted into boiling energy for the melt M.

It will be appreciated by those skilled in the art that the above set forth dimensions, temperatures and composition are merely by way of illustration and the present invention is not limited thereto.

Although the apparatus 1 shown in the drawings is particularly well adapted for purifying zinc by separating therefrom metals, such as cadmium, having lower boiling points than zinc, apparatus of the same general nature could be used to separate zinc from impurities such as lead or iron, which have higher boiling points than zinc. The affording of such apparatus would require the modification of certain portions of the apparatus 1 shown in the drawings, and primarily modification of the reflux column 22.

The desired modification of the apparatus 1 for affording apparatus which will separate zinc from the higher boiling point impurities, such as lead and iron, is primarily the elimination of the reflux condenser 44 on the reflux column 22. In the modified apparatus, the fractionating column 22 would preferably be properly proportioned so that 10% to 20% of the zinc in the vapor passing into the fractionating column would be refluxed to assist in scouring, the remaining zinc vapor being discharged from the fractionating column in purified form. The aforementioned zinc vapor being discharged from the fractionating column would, of course, be recovered in a suitable zinc condenser.

From the foregoing it will be seen that the present invention affords novel apparatus for purifying metals.

Also, it will be seen that the present invention affords novel apparatus which is well adapted for purifying zinc.

In addition, it will be seen that the present invention affords zinc-purifying apparatus which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. Apparatus for purifying zinc comprising
  (a) a substantially horizontally extending elongated boiler,
  (b) inlet means connected to one end of said boiler by a passageway for feeding a charge of impure molten metal containing zinc to be purified into said boiler and receiving vapor from said boiler,
  (c) means for heating said boiler to above the boil-point of certain materials in said molten metal to thereby vaporize said materials,
  (d) means dividing said boiler into a tortuous path
    (1) for said molten metal from said one end to the other end of said boiler, and
    (2) for said vaporized materials from said other end to said one end,
  (e) means, including a reflux column mounted on and projecting upwardly from said inlet means in direct communication therewith, for receiving said vaporized materials from said boiler, separating those of said vaporized materials having higher boiling points from the other of said vaporized materials, and returning said higher boiling point materials to the molten metal in said inlet means, and
  (f) means for discharging molten metal from said other end of said boiler.

2. Apparatus for purifying zinc comprising
  (a) an elongated substantially horizontally extending boiler,
  (b) means for feeding a melt of molten impure zinc into one end of said boiler,
  (c) means for heating said boiler to at least the boiling point of zinc to thereby vaporize zinc and materials having a lower boiling point than zinc from said melt,
  (d) a plurality of laterally spaced, elongated, upstanding partition walls extending horizontally in said boiler, transversely to the length thereof,
  (e) alternate ones of said partition walls extending from respective opposite longitudinal side walls of said boiler and terminating at their other ends in inwardly spaced relation to the other longitudinal side walls of said boiler in position to afford passageways between said other ends of said partition walls and the adjacent said other side walls for affording a tortuous path for said melt at the bottom of said boiler from said one end of said boiler to the other end thereof, and a tortuous path for vapor at the top of said boiler, and counter-current to said first mentioned path, from said other end of said boiler to said one end thereof,
  (f) means, including a reflux column, connected to said one end of said boiler for receiving vapor from said boiler and separating zinc from said vaporized zinc and said vaporized materials and returning said separated zinc in molten form to said melt in said one end of said boiler, and
  (g) means for discharging molten zinc from said other end of said boiler.

3. Apparatus as defined in claim 2, and in which
  (a) said means for heating said boiler comprises a combustion chamber,
  (b) said boiler includes a top wall separating said boiler from said combustion chamber and through which heat passes from said combustion chamber to said boiler for so heating said boiler, and
  (c) said top wall rests upon and is supported by said partition walls.

4. Apparatus as defined in claim 3, and in which
(a) said top wall comprises a plurality of interlockingly engaged silicon carbide panels.
5. Apparatus as defined in claim 4, and in which
(a) said top wall is substantially flat.
6. Apparatus as defined in claim 2, and in which
(a) said reflux column is mounted directly above, and is in direct communication with, said means for feeding a melt.
7. Apparatus as defined in claim 6, and in which
(a) said reflux column comprises a cadmium column having
(1) a lower fractionating portion embodying a plurality of vertically spaced fractionating trays, and
(2) an upper reflux condenser mounted on top of said fractionating portion.

8. Apparatus as defined in claim 2, and in which
(a) said means for feeding a melt is connected to the interior of said one end of said boiler by a passageway which extends above said melt.

References Cited

UNITED STATES PATENTS 2,939,783  6/1960  Lundevall _____ 266—19 X
3,149,194  9/1964  Handwerk _____ 266—19 X J. SPENCER OVERHOLSER, *Primary Examiner.*

R. D. BALDWIN, *Assistant Examiner.*

U.S. Cl. X.R.

75—88; 266—19